(12) United States Patent
Hsu

(10) Patent No.: US 7,200,012 B1
(45) Date of Patent: Apr. 3, 2007

(54) CIRCUIT UTILIZING A PUSH-PULL PULSE WIDTH MODULATOR TO CONTROL A FULL-BRIDGE INVERTER

(75) Inventor: Da-Jing Hsu, Taipei (TW)

(73) Assignee: Niko Semiconductor Co., Ltd. (TW)

( * ) Notice: Subject to any disclaimer, the term of this patent is extended or adjusted under 35 U.S.C. 154(b) by 0 days.

(21) Appl. No.: 11/356,752

(22) Filed: Feb. 21, 2006

(51) Int. Cl.
H02M 3/335 (2006.01)
H02M 7/5387 (2006.01)
H02M 7/68 (2006.01)

(52) U.S. Cl. .............................. 363/17; 363/132; 363/98
(58) Field of Classification Search .................. 363/17, 363/132, 98
See application file for complete search history.

(56) References Cited

U.S. PATENT DOCUMENTS 5,925,984 A * 7/1999 Fischer et al. .............. 315/219
6,185,111 B1 * 2/2001 Yoshida ........................ 363/17
6,452,816 B2 * 9/2002 Kuranuki et al. .............. 363/17
6,490,183 B2 * 12/2002 Zhang .......................... 363/89
6,504,739 B2 * 1/2003 Phadke ........................ 363/127
6,512,352 B2 * 1/2003 Qian .......................... 323/282
6,888,728 B2 * 5/2005 Takagi et al. .................. 363/17
6,956,361 B1 * 10/2005 Mozipo et al. .............. 323/283
6,999,328 B2 * 2/2006 Lin .............................. 363/71

* cited by examiner

*Primary Examiner*—Bao Q. Vu

(57) ABSTRACT

The present invention provides an improved circuit utilizing a full-bridge inverter circuit controlled by a push-pull pulse width modulator, wherein the circuit of the invention utilizes an inverter circuit to control the electronic switches of the full-bridge inverter circuit. Thus, the push-pull pulse width modulator can control and drive the operations of the full-bridge inverter circuit. Two outputs of the push-pull pulse width modulator are connected to two inputs of the inverter circuit in order to produce four inverting signals controlling respectively four full-bridge electronic switches. The circuit of the present invention directly converts a direct current power to an alternate current power providing the energy source to cold cathode fluorescence lamps.

10 Claims, 11 Drawing Sheets

CIRCUIT UTILIZING A PUSH-PULL PULSE WIDTH MODULATOR TO CONTROL A FULL-BRIDGE INVERTER

FIELD OF INVENTION

The present invention relates to a circuit comprising a full-bridge inverter which is controlled by a push-pull pulse width modulator. More particularly, the present invention relates to a circuit that can directly convert a direct current to an alternate current in order to provide energy source to cold cathode fluorescence lamps.

DESCRIPTION OF THE RELATED ART

The lighting source located on a back side of a liquid crystal display (LCD) is utilized a high frequency alternate current of sine wave power source to provide lighting energy for the cold cathode fluorescence lamps (CCFL). Therefore, the conventional method requires an inverter to invert the direct current (DC) to the alternate current (AC) so that an inverting current process can be achieved. Those conventional inverter circuits are categorized into half-bridge inverter circuits, full-bridge inverter circuits and push-pull inverter circuits in according to the difference of the circuit topologies.

FIG. 1 shows a schematic diagram of a conventional push-pull inverter circuit. The push-pull inverter circuit comprises a main transformer T1, wherein the circuit area is divided into a primary circuit 101 and a secondary circuit 201. The primary circuit 101 further comprises a direct current VI, a first switch Q1 and a second switch Q2. The secondary circuit 201 comprises capacitors C3, C4 and C5, a CCFL, diodes D1 and D2. A push-pull pulse width modulator 102 is connected in between the primary circuit 101 and the secondary circuit 201. The push-pull pulse width modulator 102 is utilized to feedback the voltage of the secondary circuit 201 and the current signals in order to control outputting the waveform width adjustable secondary output voltage and the current of the CCFL.

Refer to FIG. 2, a diagram showing a schematic view of circuit waves of a conventional push-pull inverter. The push-pull pulse width modulator 102 outputs a first output signal OUT1 and a second output signal OUT2, wherein the first output signal OUT1 and the second output signal OUT2 output the pulse width adjustment in accordance with the push-pull pulse width modulator 102 to control respectively the inverting function of a first switch Q1 and a second switch Q2 of the primary winding circuit 101. Simultaneously, the voltage of the direct current power VI is inverted through an inverter T1 to alter DC into AC, required by the CCFL, is provided by the secondary winding circuit 201. As shown in FIG. 2, the push-pull pulse width modulator 102 outputs the first output signal OUT1 and the second output signal OUT2. The primary winding of the transformer T1 produces positive and negative periods of waveforms of the AC voltage, wherein the amplitude of the AC is the twice amount of the DC. The secondary winding produces voltage waveforms of the alternating current.

The push-pull pulse width modulator 102 can be one of those push-pull types of pulse wave controllers sold on the market such as, OZ9RR of O2 Micro, BIT_3193 of BITEC or LX1688 of Microsemi.

FIG. 3 shows a schematic view of a circuit diagram of a conventional full-bridge inverter circuit. A transformer T1 divides the circuit area into a primary circuit 301 of a primary winding and a secondary circuit 401 of a secondary winding. The primary circuit 301 comprises four electronic switches A, B, C and D, a full-bridge type of pulse wave controller 302 and a direct current isolating capacitor C1. The secondary circuit 401 comprises two capacitors C2 and C3, a CCFL and two diodes, D5 and D6. The full-bridge pulse width modulator 302 outputs four output control signals P1, N1, P2 and N2 to control respectively an inverting function of four electronic switches A, B, C and D. Simultaneously, the voltage of the direct current VI is inverted through an inverter T1 to alter its direct current into an alternating current, required by the CCFL, is provided by the secondary winding circuit 401. The full-bridge pulse width modulator 302 can be one of those full-bridge pulse width modulators that are available in the market, such as OZ960 of O2 Micro or BIT_3105 of BITEC.

FIG. 4 is a diagram of illustrating a schematic view of current paths of a full-bridge inverter circuit controlled by a pulse width modulator of a conventional OZ960 of O2 Micro. FIG. 5 is a diagram of showing a schematic view of operating waveforms of a full-bridge inverter circuit controlled by a pulse width modulator of a conventional OZ960 of O2 Micro. Refer to FIGS. 4 and 5, the inverter circuit produces four signals to control respectively four electronic switches A, B, C and D. The current paths of the full-bridge inverter circuit controlled by a pulse wave controller have eight timing regions, t1–t8, indicating within the period section of FIG. 5. Once switches, A and D in the t1 region, are in an on status, the direct current VI provides energy to the inverter T1. When the switch D in the t2 region is switched off, and the switch A and a diode D3 are both in the on status, the transformer T1 will pass through the paths of the switch A and the diode D3 to transmit energy. Once the current starts to flow between the t3 region and the switch C, the diode D3 will be switched off due to the short-circuit, as a result of the current passing through the switch C. The current path will alter to pass through the switches C and A. When the switch A in the t4 region is switched off, the transformer T1 will transmit energy through the diode D2 and the switch C. Once the switch B in t5 region is in the on status, the diode D2 will be switched off as a consequence of the short circuit resulting from the on status of switch B. The direct current VI provides energy to the transformer T1 through the switches C and B. When the switch C in t6 region is switched off, the transformer T1 transmits energy through the diode D4 and the switch B. Once the switch D in the t7 region is switched on, the diode D4 will be switched off resulting from a short-circuit due to the current flowing through the switch D. The transformer T1 transmits energy through the switches B and D. When the switch B in t8 region is switched off, the transformer T1 transmits energy through the switch D and the diode D1.

FIG. 6 is a diagram of showing schematic view of circuit paths of a full-bridge inverter circuit controlled by a pulse width modulator of a conventional BIT3105 of Bitec. FIG. 7 illustrates a schematic view of functional waveform of a full-bridge inverter circuit controlled by a pulse width modulator of a conventional BIT3105 of Bitec. Refer to FIGS. 6 and 7, one control period comprising four electronic switches A, B, C and D. The current paths of the full-bridge inverter circuit controlled by a pulse width modulator have eight timing regions, t1–t8 as shown in FIG. 7. When the switches B and C of the t1 region are switched on, the direct current VI will provide energy to the transformer T1. When the switch C in the t2 region is switched off, and the switch B and the diode D4 is both in the on status, the transformer T1 will pass through the paths of the switch B and the diode D4 to transmit energy. When the switch D in the region t3 is in the on status, the diode D4 will be switched off due to the short circuit resulting from the on status of the switch D. The current path will then be altered by passing through the switches D and B. When the switch B in the t4 region is switched off, the transformer T1 will transmit energy via the diode D1 and the switch D. Once the current starts to pass through the switch A in the t5 region, the diode D1 will be switched off due to the short circuit resulting from the current flowing through the switch A. When the switch A in t6 region is switched off, the transformer T1 will transmit energy via the diode D2 and the switch D. Once the current starts to pass through the switch B in the t7 region, the diode D2 will be switched off due to the short circuit resulting from the current flowing through the switch B. The transformer T1 will transmit energy via the switches B and D. When the switch D in the t8 region is switched off, the transformer T1 will transmit energy through switch B and the diode D3.

From the above-mentioned examples with the reference of FIG. 3, when the user utilizes the full-bridge inverter circuit as the inverter circuit, the circuit is required to incorporate with the full-bridge pulse width modulator 302 in order to control the circuit. However, the inverter circuit is the push-pull type of inverter circuit, then a push-pull pulse width modulator 102 is required to control the functions of the circuit. As a result, the cost of this type of circuit, such as the full-bridge type of controller is more expansive. Thus, the utilization of this kind of inverter circuit is less practical.

SUMMARY OF THE INVENTION

It is an object of the present invention to provide a circuit of full-bridge inverter controlled by a push-pull pulse width modulator, so that the flexibility of its utilization is increased and its fabrication cost is reduced. The present invention provides a circuit of full-bridge inverter controlled by a push-pull pulse width modulator, and capable of inverting direct current (DC) to alternate current (AC) via a transformer. The circuit of full-bridge inverter controlled by the push-pull pulse width modulator of the present invention comprises a push-pull pulse width modulator, a transforming circuit and s full-bridge switch unit.

The push-pull pulse width modulator comprises a first push-pull output terminal and a second push-pull output terminal that produces respectively a first push-pull signal and a second push-pull signal. The transforming circuit utilizes the first push-pull signal and the second push-pull signal to delay a starting point or an ending point of every pulse waveform in order to produce respectively a first transforming signal, a second transforming signal, a third transforming signal and a fourth transforming signal. The full-bridge switch unit comprises a first electronic switch, a second electronic switch, a third electronic switch and a fourth electronic switch. Wherein the first inverting signal, the second inverting signal, the third inverting signal and the fourth inverting signal are used to control respectively on and off statues of the four electronic switches so that the direct current can be inverted into an alternating current, and transmit the current to a primary winding of the transformer.

The above-mentioned circuit of the present invention, can further be utilized to drive a plurality of sets of full-bridge electronic switches, and simultaneously control the plurality of full-bridge inverters. Therefore, the circuit of the present invention can be utilized in half-bridge inverters. As a matter of fact, the push-pull pulse width modulator can be utilized in various types of circuit topologies of inverters. Thus, the utilization of the circuit of the present invention is more practical and flexible.

BRIEF DESCRIPTION OF THE DRAWINGS

The accompanying drawings are included to provide a further understanding of the present invention, and are incorporated in and constitute a part of this specification. The drawings illustrate embodiments of the invention and, together with the descriptions, serve to explain the principles of the invention. In the drawings.

DETAILED DESCRIPTION OF THE PREFERRED EMBODIMENTS

Figure 1:
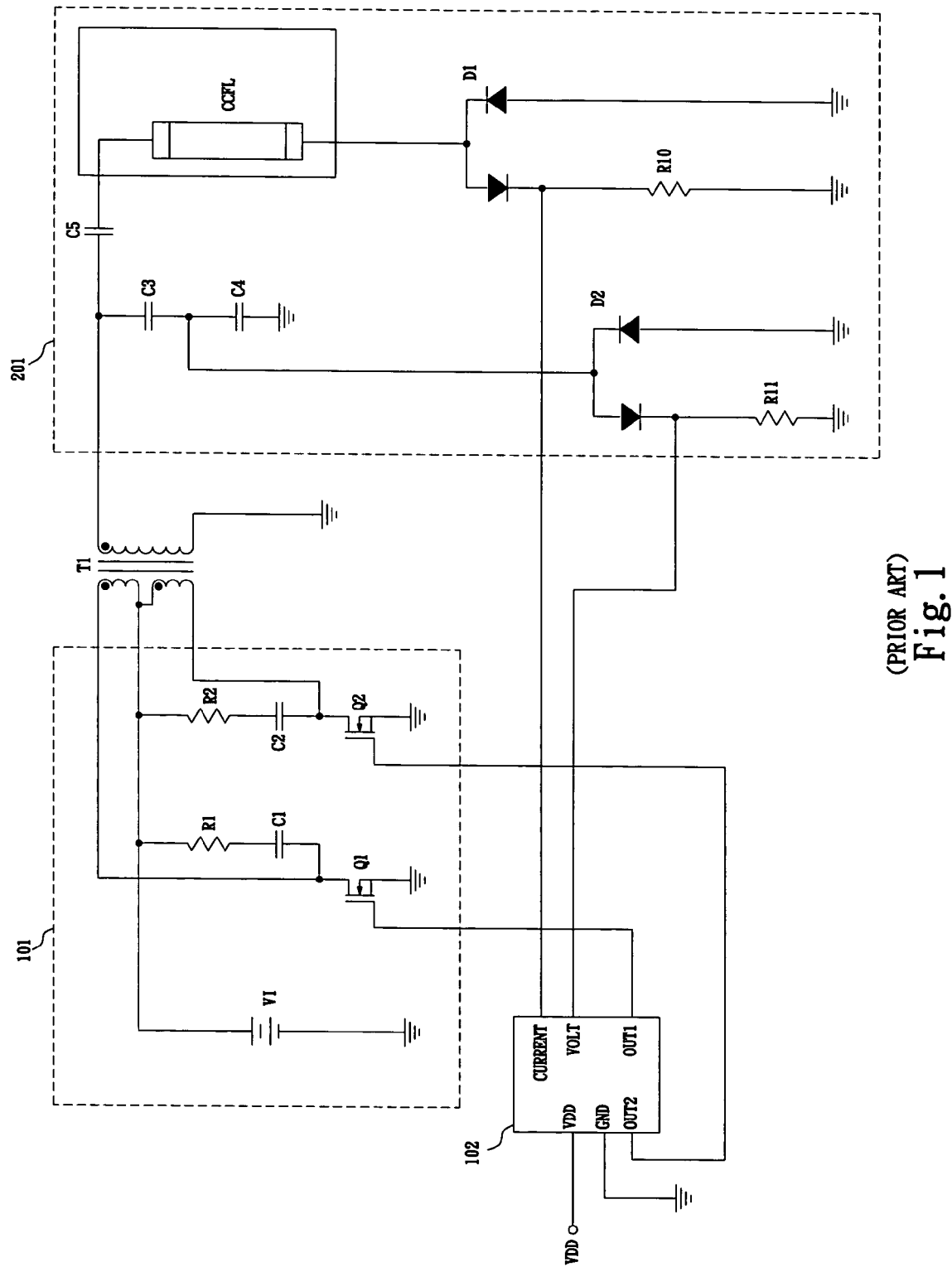
FIG. 1 shows a schematic diagram of a conventional push-pull inverter circuit driven a circuit providing energy source to cold cathode fluorescence lamps.
Figure 2:
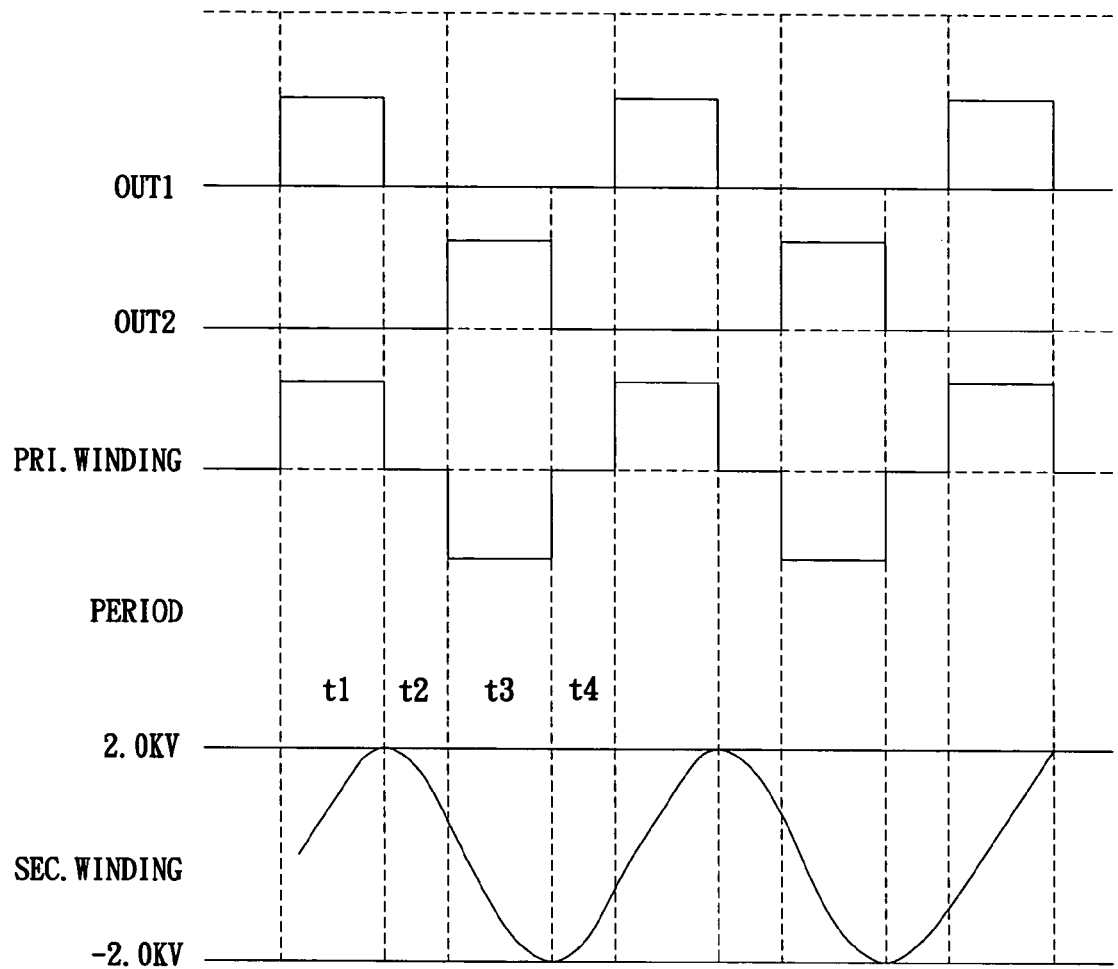
FIG. 2 illustrates a diagram showing a schematic view of circuit waves of a conventional push-pull inverter.
Figure 3:
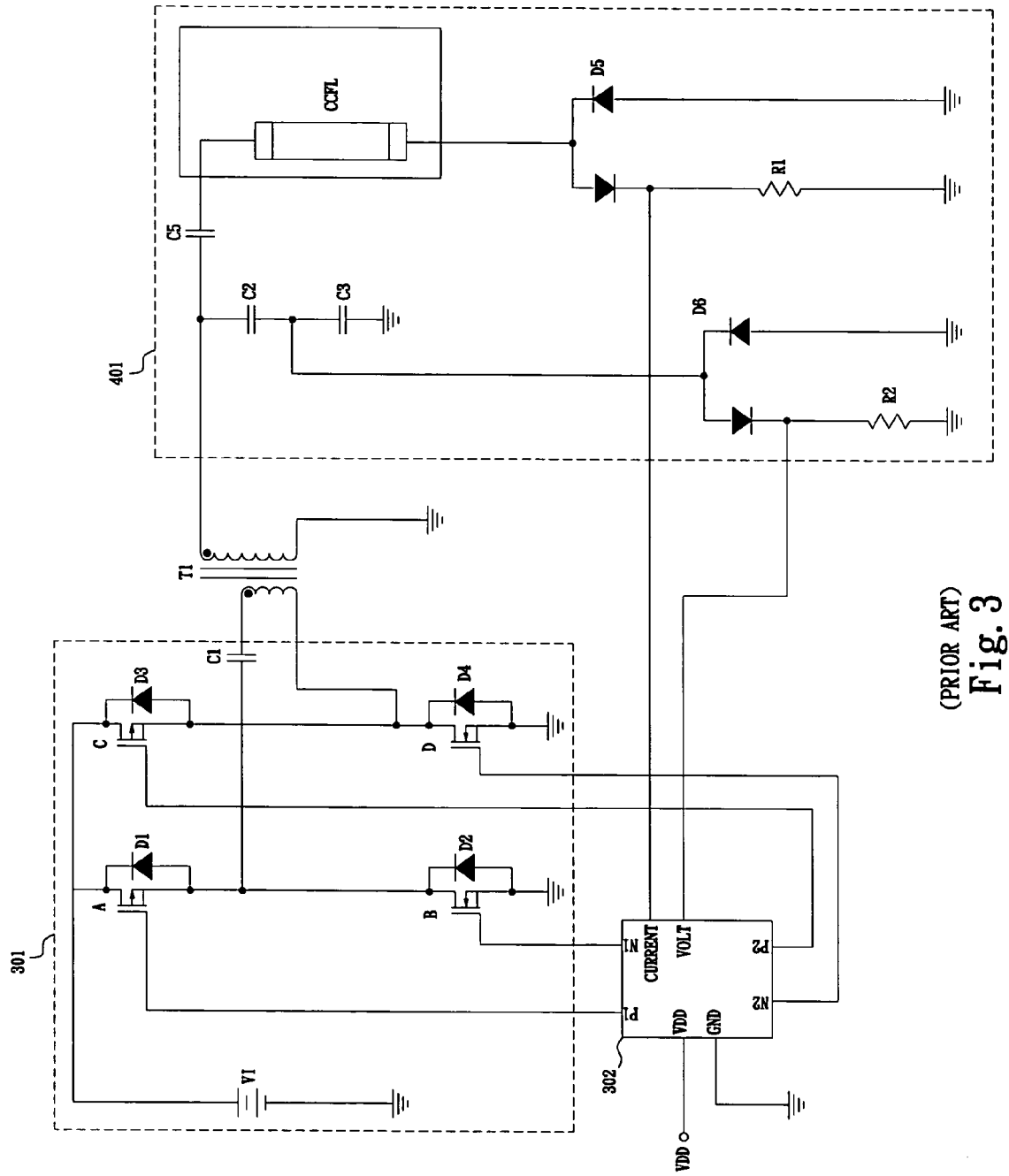
FIG. 3 is a schematic view of a circuit diagram of a conventional full-bridge inverter circuit.
Figure 4:
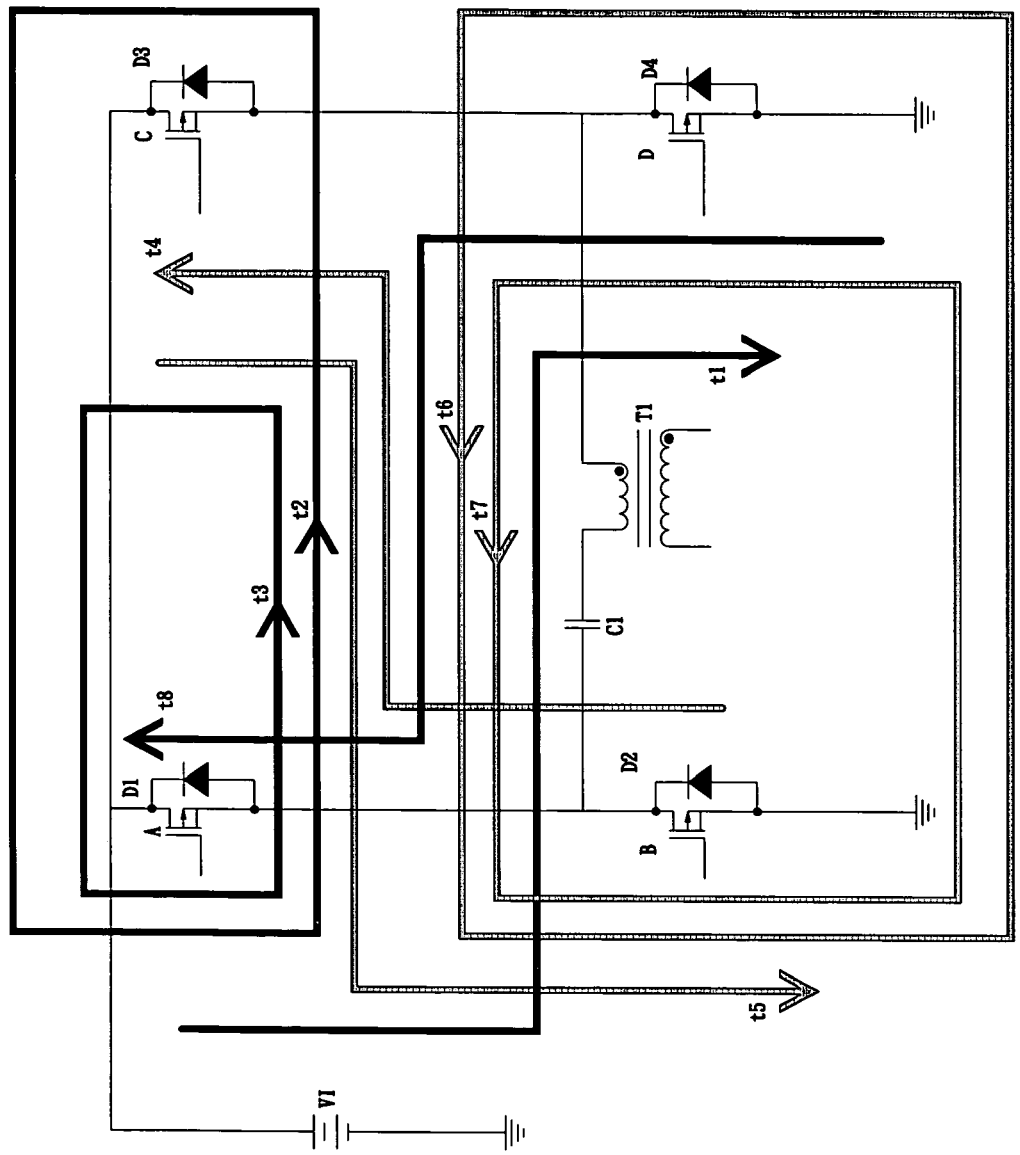
FIG. 4 shows a schematic diagram of current paths of a full-bridge inverter circuit controlled by a pulse width modulator of a conventional OZ960 of O2 Micro.
Figure 5:
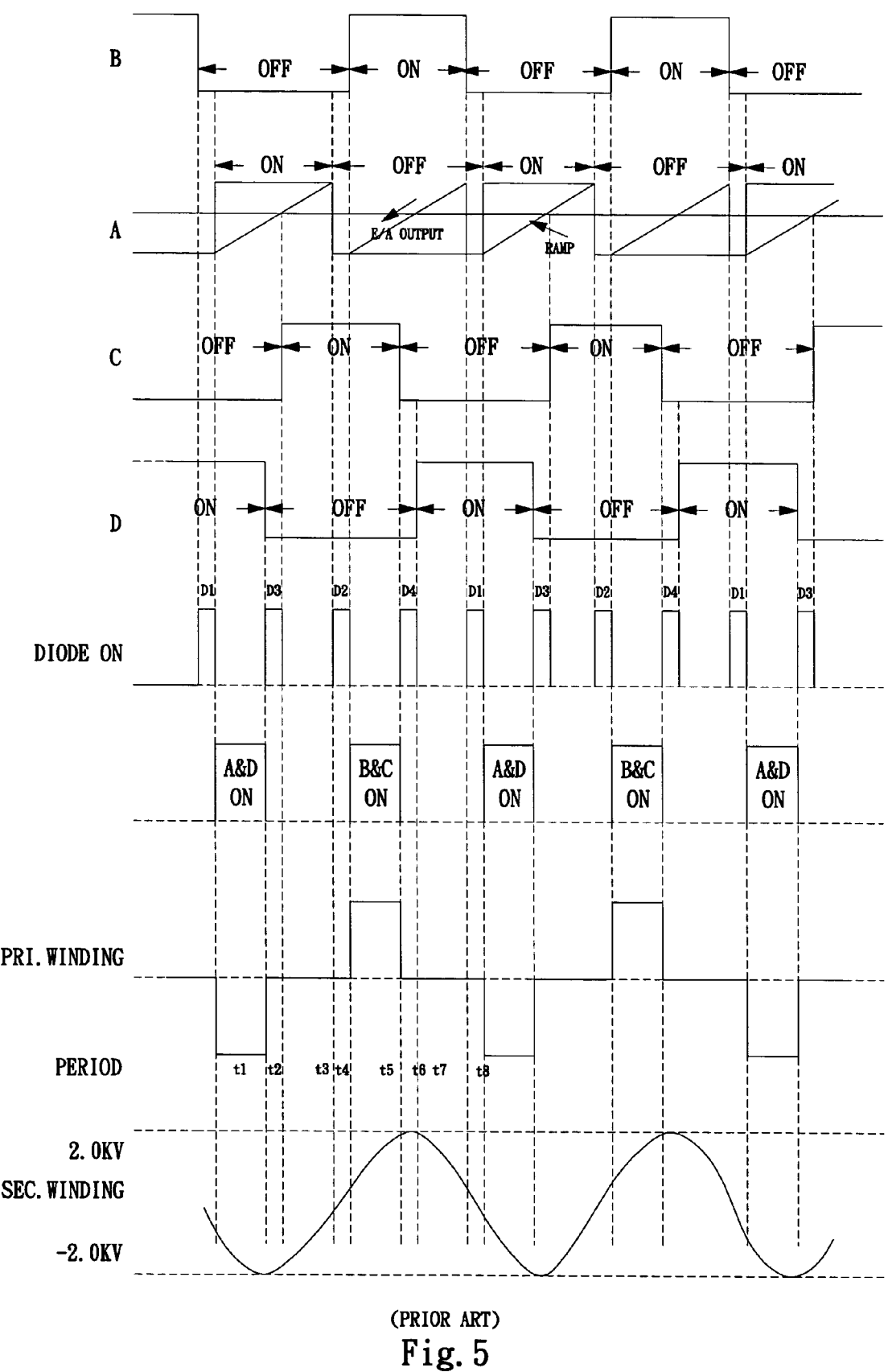
FIG. 5 illustrates a schematic diagram of operating waveforms of a full-bridge inverter circuit controlled by a pulse width modulator of a conventional OZ960 of O2 Micro.
Figure 6:
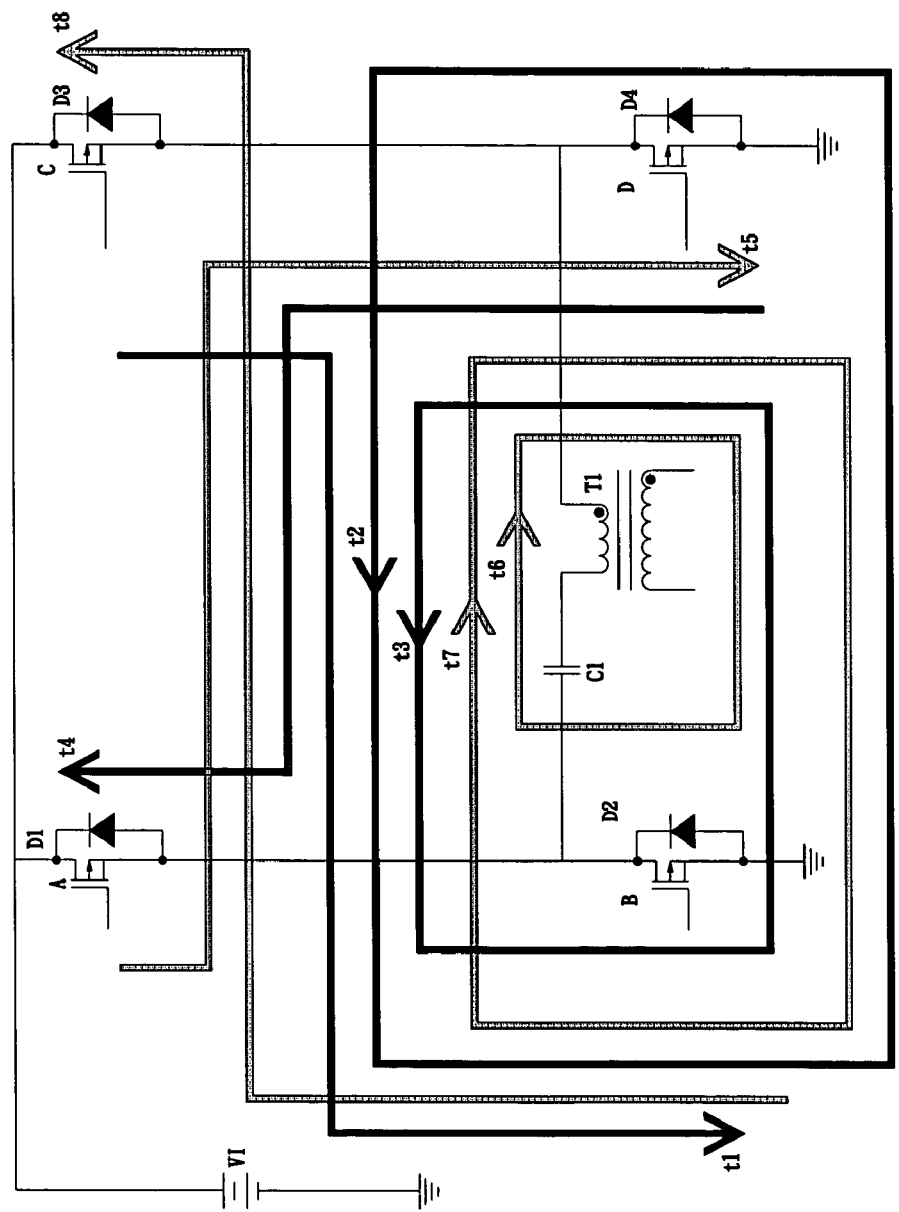
FIG. 6 is a diagram of showing schematic view of circuit paths of a full-bridge inverter circuit controlled by a pulse width modulator of a conventional BIT3105 of Bitec.
Figure 7:
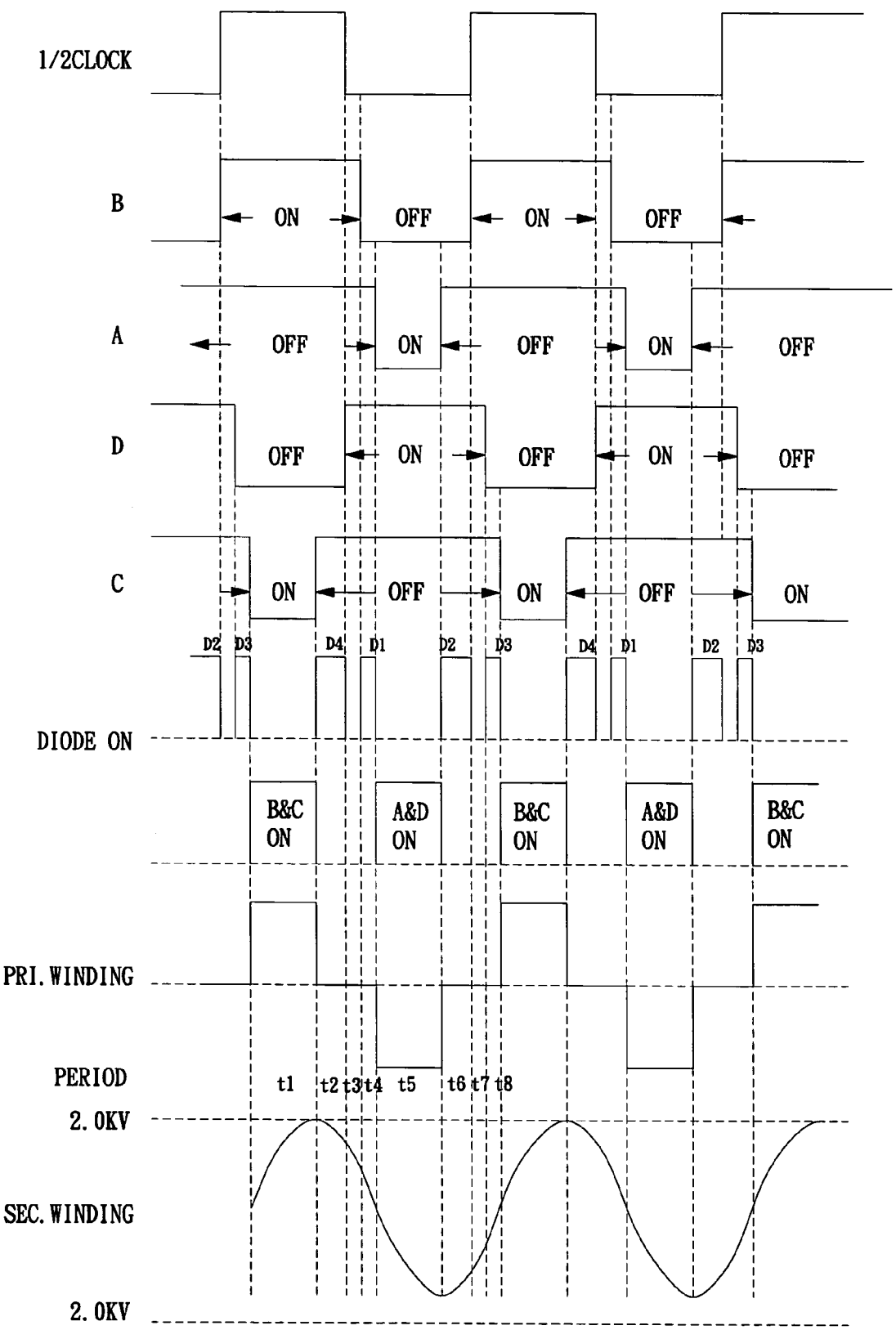
FIG. 7 illustrates a schematic view of functional waveforms of a full-bridge inverter circuit controlled by a pulse width modulator of a conventional BIT3105 of Bitec.
Figure 8:
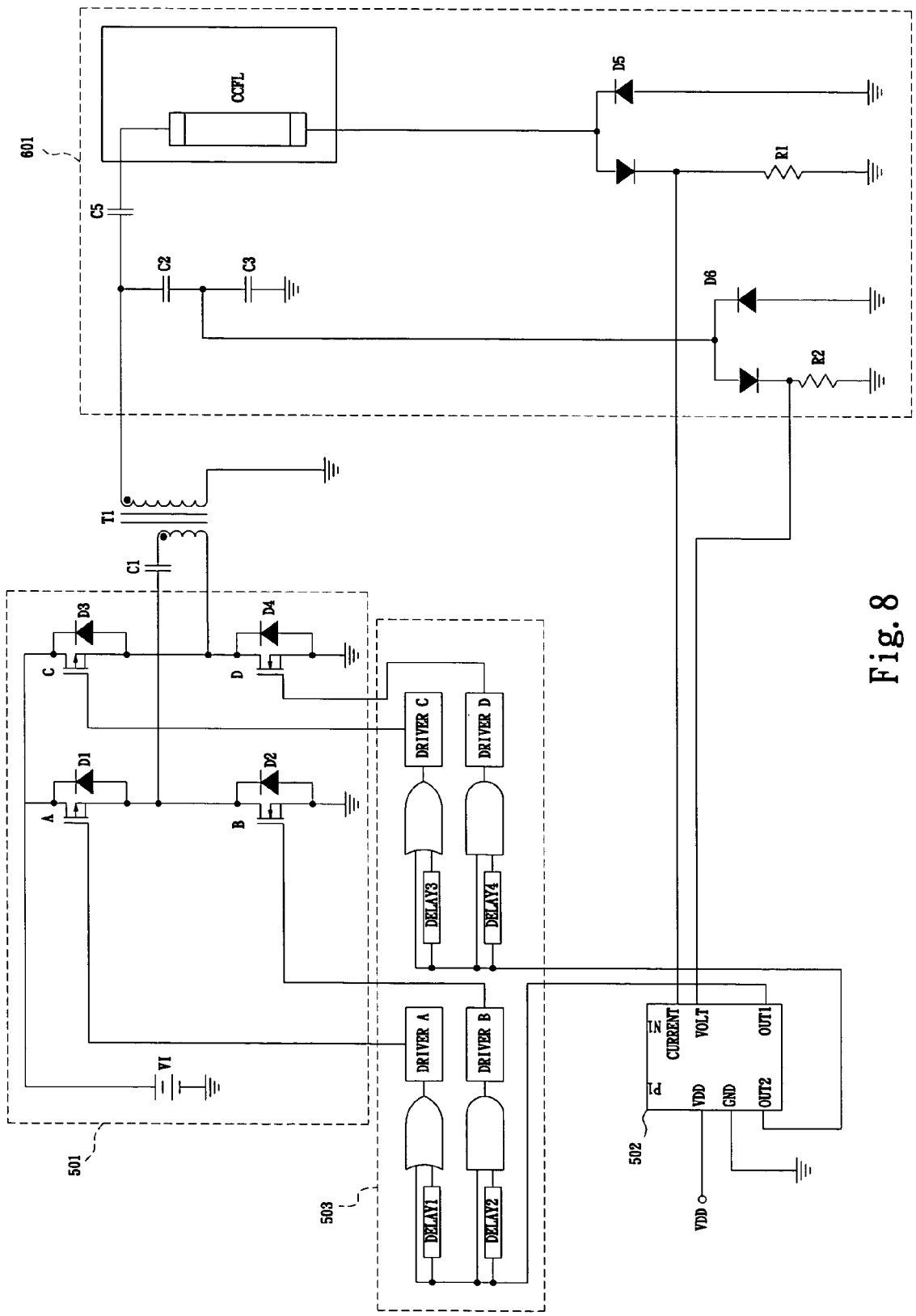
FIG. 8 shows a schematic view of a circuit utilizing a full-bridge inverter controlled by a push-pull pulse width modulator in accordance with a preferred example of the present invention.

FIG. 8 shows a schematic view of a circuit utilizing a full-bridge inverter controlled by a push-pull pulse width modulator in accordance with a preferred example of the present invention. The circuit utilizing the full-bridge inverter controlled by a push-pull pulse width modulator of the present invention comprises a transforming circuit 503 connected in between four electronic switches A, B, C and D of a full-bridge inverter circuit 501, and a push-pull pulse width modulator 502. Wherein, four outputs of a full-bridge pulse width modulator can be replaced by two outputs of the push-pull pulse width modulator 502. The transforming circuit 503 receives push-pull signals outputted from the push-pull pulse width modulator 502. Those push-pull signals are transformed and outputted to four transforming signals for controlling an inverting operation of four electronic switches A, B, C and D.

As shown in FIG. 8, the circuit utilizing the full-bridge inverter controlled by a push-pull pulse width modulator of the present invention comprises the push-pull pulse width modulator 502, the transforming circuit 503 and the full-bridge switch unit 501 to invert the direct current VI into the alternating current, and then transmit the current to a primary winding of the transformer T1. Wherein the push-pull pulse width modulator 502 of the present invention further comprises a first push-pull output OUT1 and a second push-pull output OUT2 to produces respectively a first push-pull signal and a second push-pull signal. The transforming circuit 503 comprises four delay units DELAY 1, DELAY 2, DELAY 3 and DELAY 4 to produce respectively delay signals to a plurality of drivers, DRIVERA, DRIVERB, DRIVERC and DRIVERD.

The first push-pull output OUT1 of the push-pull pulse width modulator 502 is connected to the delay units DELAY 1 and DELAY 2. The second push-pull output OUT2 of the push-pull pulse width modulator 502 is connected to the delay units DELAY 3 and DELAY 4. When the pulse waveforms of the first push-pull output OUT1 of the push-pull pulse width modulator 502 is transformed from a low voltage to a high voltage, the delay unit DELAY 1 will directly transform an output of the driver A from a low voltage to a high voltage without delaying so that the electronic switch A can be switched off rapidly. At the same time, the delay unit DELAY 2 produces a delay signal to delay a transformation of an output of the driver B from a low voltage to a high voltage as a result, the electronic switch B will be delayed to switch on.

When the first push-pull output OUT1 of the push-pull pulse width modulator 502 is transformed from the high voltage to the low voltage, the delay unit DELAY 1 will delay to pass through the driver A and transform the high voltage to the low voltage resulting the electronic switch A being switched on. Simultaneously, the delay unit 2 will directly transform an output of the driver B from the high voltage to the low voltage without holding up so that the electronic switch B can be switched off. Similarly, when the second push-pull output OUT 2 of the push-pull pulse width modulator 502 transforms from the low voltage to the high voltage, the delay unit DELAY 3 will transform directly the output of driver C from the low voltage to the high voltage without any delay to switch the electronic switch C off quickly. At the moment, the delay unit DELAY4 will produce a delay signal to delay a transformation of an output of the driver D from the low voltage to the high voltage, thereafter, the electronic switch D will be delayed to switch on. When the second push-pull output OUT2 of the push-pull pulse width modulator 502 transforms from the high voltage to the low voltage, the delay unit DELAY3 will delay to transform the output of the driver C from the high voltage to the low voltage as a result, the electronic switch C will be delayed to switch on.

Simultaneously, the delay unit DELAY4 transforms the output of the driver D directly from the high voltage to the low voltage without any delay, subsequently, the electronic switch D will be switched off rapidly. The four outputs of the drivers A, B, C and D produce respectively four transforming signals to drive respectively the transforming actions of those electronic switches, A, B, C and D. Wherein, the electronic switches B and C control the current pass through process during a negative half-period, and the electronic switches A and D control the current pass through process in a positive half-period in order to produce the AC that is required by the secondary of the transformer T1.

The present invention provides a circuit utilizing a push-pull pulse width modulator 502 to transform and control a full-bridge inverter so that the direct current VI can be inverted into the high frequency of AC. The transformer T1 is utilized to transmit the AC to the secondary of the transformer T1 in order to provide lighting energy for the cold cathode fluorescence lamps (CCFL). Wherein, the push-pull pulse width modulator can be selected from push-pull pulse width modulators in the current market or a group of components assembled push-pull control circuits.

Refer to FIG. 8, the primary winding of the transformer T1 can be connected to the full-bridge inverter circuit 501 through the direct current (DC) isolating capacitor C1 in order to separate the direct current portion from the alternate current (AC) of the secondary of the transformer T1.

Figure 9:
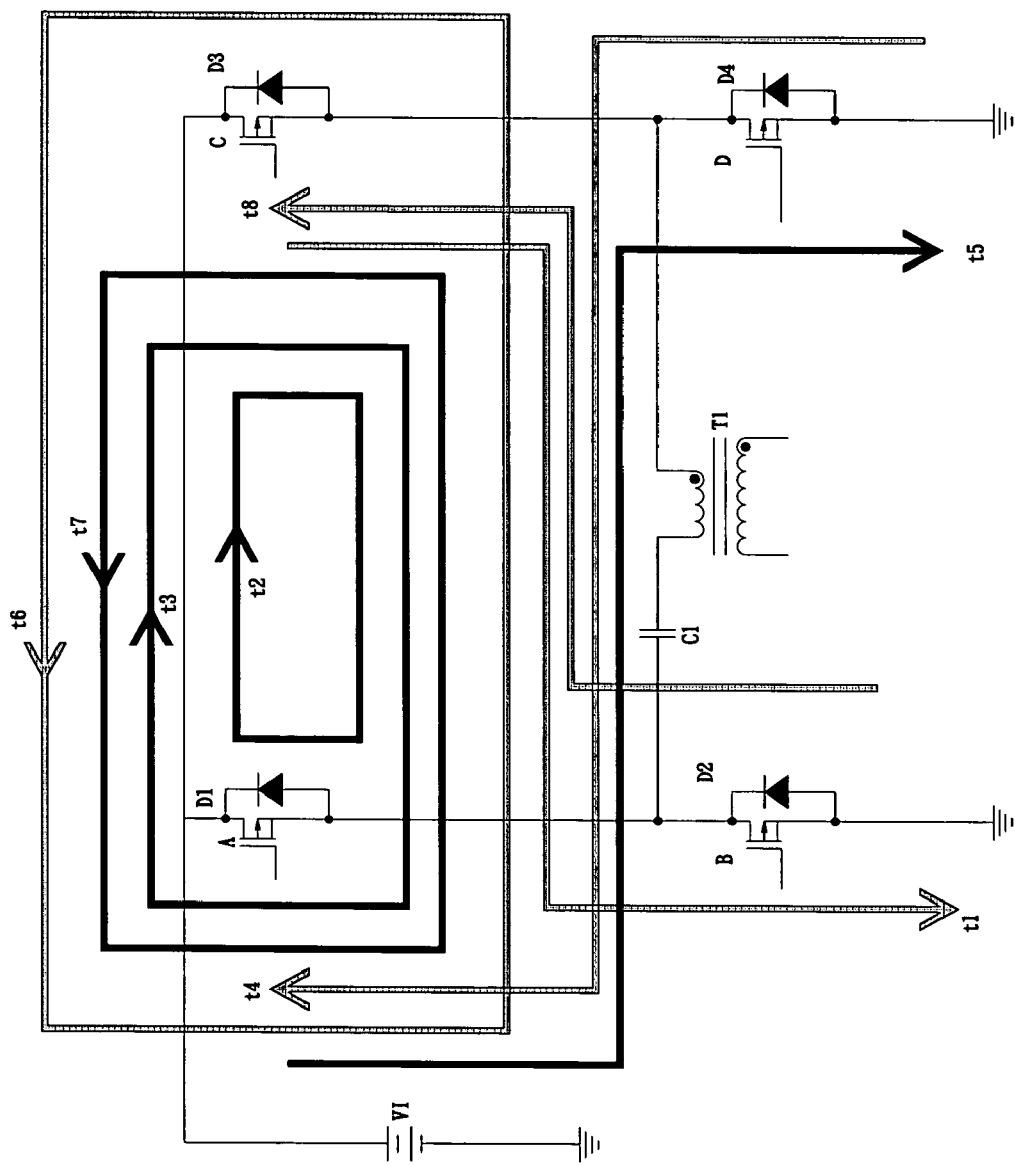
FIG. 9 shows a schematic diagram of current paths of a circuit utilizing a full-bridge inverter circuit controlled by a push-pull pulse width modulator of the present invention.
Figure 10:
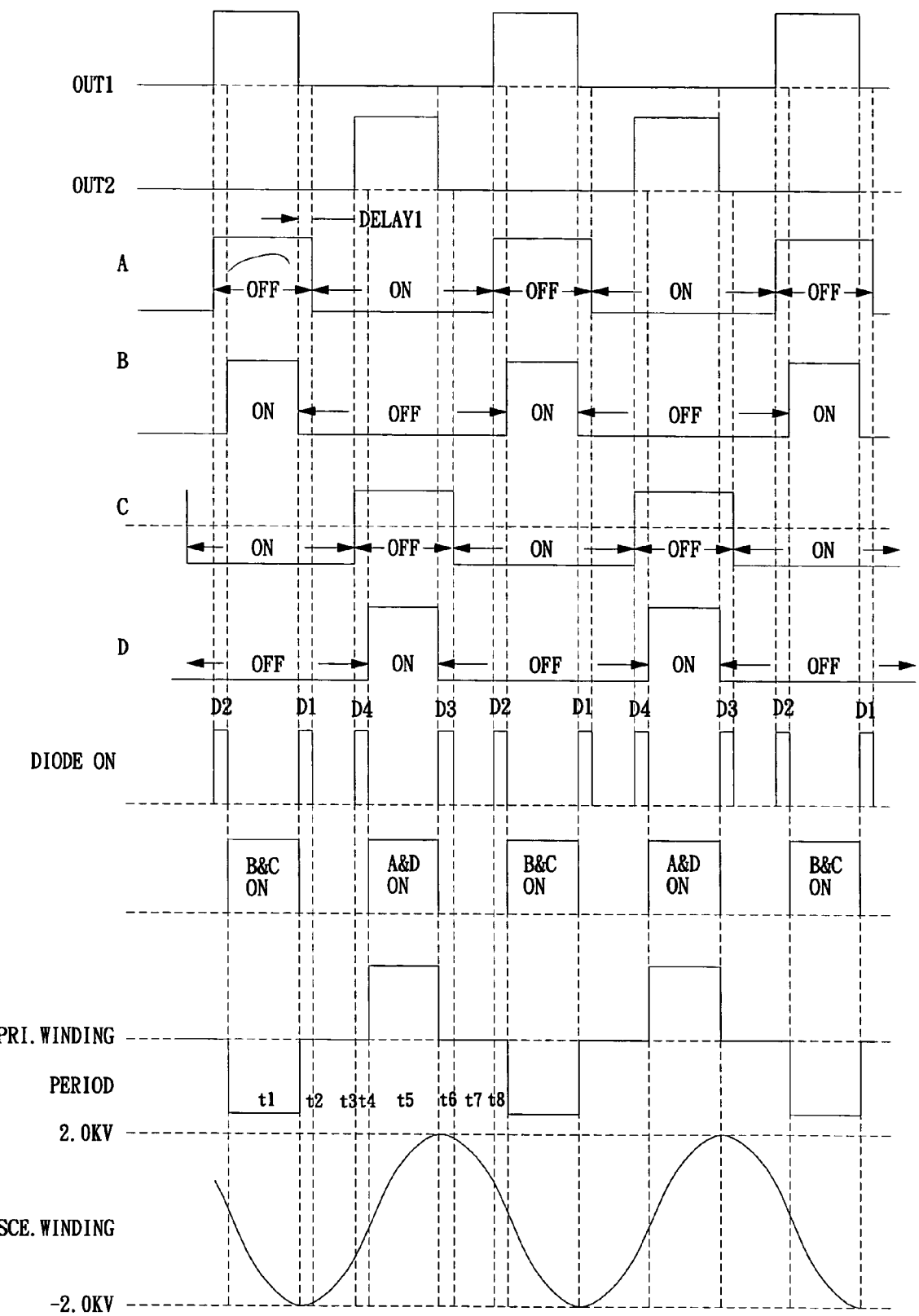
FIG. 10 illustrates a schematic diagram of operating waveforms of the full-bridge inverter circuit of the present invention.

FIG. 9 shows a schematic diagram of current paths of a circuit utilizing a full-bridge inverter circuit controlled by a push-pull pulse width modulator of the present invention. FIG. 10 illustrates a schematic diagram of operating waveforms of the circuit of the present invention. Refer to FIGS. 9 and 10, the main characteristics of the present invention, which are different from the conventional circuits are the current paths of the full-bridge inverter circuit controlled by a push-pull pulse width modulator and the operating waveforms of the circuit. The pulse waves of the four output controlling electronic switches, A, B, C and D of the prior art OZ960 of the O2 Micro pulse width modulator are all in the same direction and have a fixed pulse width formation. The prior art utilizes the feedback signal to control the output phase-shifting methods respectively in accordance with those simultaneous current connecting periods of the corresponding current switches, A and D, B and C, and the working periods of the direct current VI supplied to the transformer T1. On the other hand, the prior art BIT3105 of the Bitec outputs pulse waves that control the electronic switches B and D have two equal and fixed pulse widths but different phases. The two pulse waves that control the electronic switches A and C are produced in according to the feedback signals with various pulse widths. FIG. 10, the full-bridge inverter circuit of the present invention comprises the four electronic switches A, B, C and D, wherein the control periods of the fourth electronic switches vary in accordance with the pulse widths of the two output OUT1 and OUT2 of the push-pull pulse width modulator 502. Thus, the present invention provides a circuit that produces various pulse e widths unlike the prior art circuits produced the fixed and identical pulse widths.

The circuit of the present invention utilizing the full-bridge inverter circuit comprises eight regions, t1–t8. When the electronic switches B and C of the region t1 are switched on, the direct current VI will provide the energy to the transformer T1. When the electronic switch B of region t2 is switched off, the electronic switch C and the diode D1 are in on status, the transformer T1 will pass through the electronic switch C and the diode D1 to transmit the energy. Once the electronic switch A in the t3 region is switched on, the diode D1 will be switched off due to the short circuit resulting from the on status of the electronic switch A. The current path of the circuit will be altered via the electronic switches A and C.

When the switch C in the t4 region is switched off, the transformer T1 will transmit the energy via the diode D4 and the electronic switch A. Once the current starts to pass through the switch D of the t5 region, the diode D4 will be switched off due to the short circuit resulting from the on status of the electronic switch D. The direct current VI provides the energy to the transformer T1 via the electronic switches D and A. When the switch D in t6 region is switched off, the transformer T1 will transmit the energy through the diode D3 and the electronic switch A. Once the current starts to pass through the switch C of the t7 region, the diode D3 will be switched off due to the short circuit resulting from the on status of the electronic switch C. The transformer T1 will transmit the energy via the electronic switches C and A. When the switch A in the t8 region is switched off, the transformer T1 will transmit the energy through switch C and the diode D2.

Figure 11:
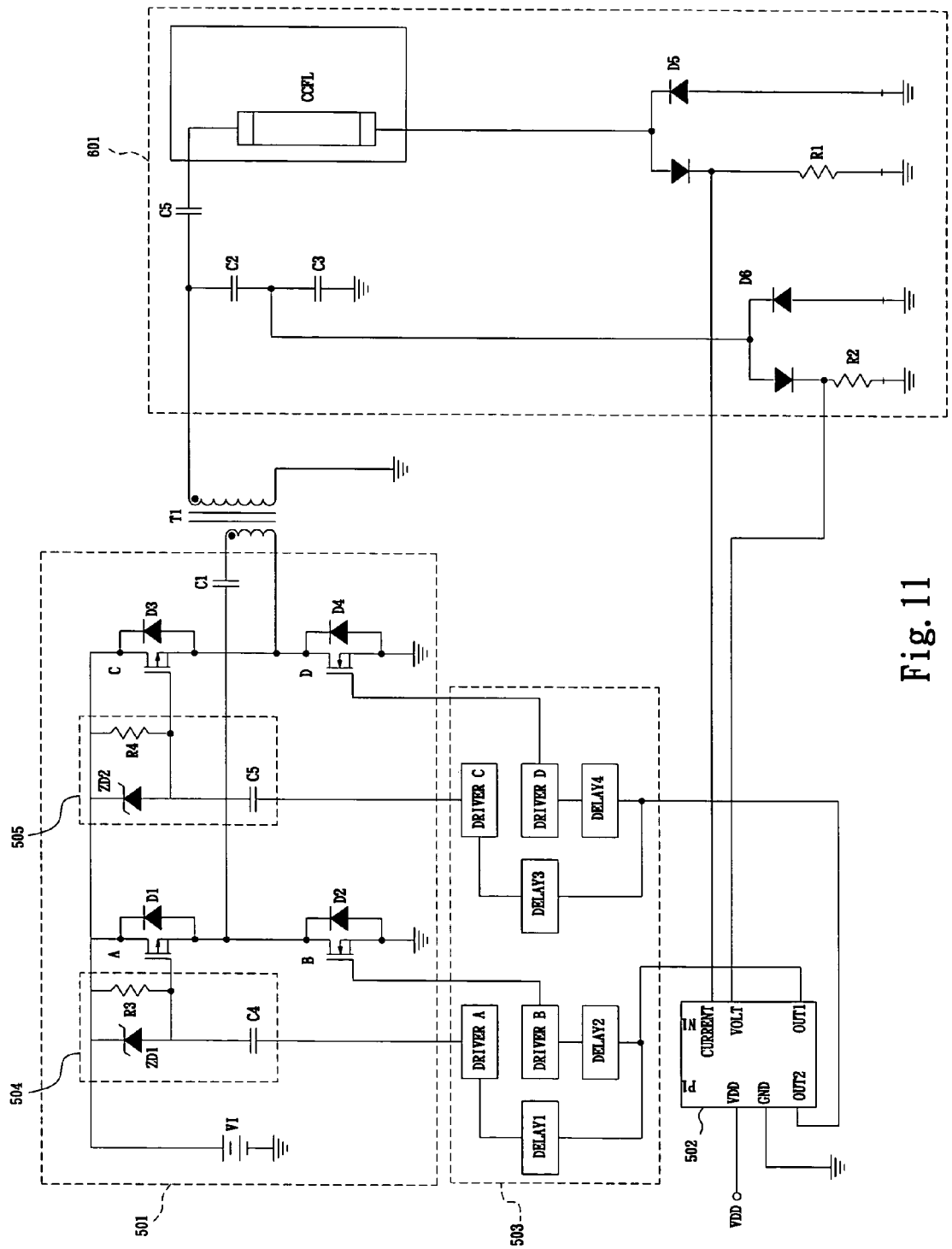
FIG. 11 illustrates a schematic diagram of a full-bridge inverter circuit comprising an level shift circuit in accordance with another preferred example of the present invention.

FIG. 11 illustrates a schematic diagram of a full-bridge inverter circuit comprising an level offset circuit in accordance with another preferred example of the present invention. A full-bridge switch unit comprises level shift circuits 504 and 505 installed respectively in between an inverter circuit and at least one of four electronic switches. The level shift circuits 504 and 505 invert and adjust the offset of the input signals OUT1 and OUT2 to suitable voltage offset in order to drive the electronic switches.

The above-mentioned circuit of the present invention, its electronic switches A, B, C and D comprises body diodes that can be categorized into four diodes D1, D2, D3 and D4 respectively, or those body diodes connected in parallel with the electronic switches of current channels. Furthermore, the circuit of the present invention comprises delay units DELAY1, DELAY2, DELAY 3 and DELAY4 that can have identical delay timing or different delay timing.

In other words, the present invention provides an improved circuit utilizing a full-bridge inverter circuit controlled by a push-pull pulse width modulator, wherein the circuit of the invention can utilizes the push-pull pulse width modulator to drive the full-bridge inverter circuit, the circuit of the present invention can input signals though the level offset circuit to invert offset to a variety with higher output driving status so that the operation of the current switches in a better conduction, in other words, the operation of the current switches is operated in a state with lower turn-on resistance. Moreover, the present invention can utilize a push-pull pulse width modulator to control a circuit with more than one inverter circuit. The circuit of the present invention can also control simultaneously a plurality of sets of full-bridge inverters. However, the circuit of the present invention is not limited to the utilization of the full-bridge inverters, it can also be utilized in half-bridge inverters. Therefore, the push-pull pulse width modulator of the present invention can be utilized in the topologies with various inverters. The practicability and utilization of the present invention are more flexible and valuable.

With the invention has been described by way of example and in terms of a preferred example embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A circuit of full-bridge inverter controlled by a push-pull pulse width modulator, capable of converting direct current to alternate current via a transformer, comprising:
    a push-pull pulse width modulator, having a first push-pull output terminal and a second push-pull output terminal to produce respectively a first push-pull signal and a second push-pull signal;
    a transforming circuit, utilizing the first push-pull signal and the second push-pull signal to delay a starting point or an ending point of every pulse to produce respectively a first transforming signal, a second transforming signal, a third transforming signal and a fourth transforming signal; and
    a full-bridge switch unit, comprising a first electronic switch, a second electronic switch, a third electronic switch and a fourth electronic switch, wherein the first transforming signal, the second transforming signal, the third transforming signal and the fourth transforming signal are used to control respectively on and off statues of the four electronic switches so that the direct current can be converted into an alternate current that is transmitted to a primary winding of the transformer.

2. The circuit of claim 1, wherein two of the four electronic switches are P-channel field effect transistors, and other two are N-channel field effect transistors.

3. The circuit of claim 1, wherein the four electronic switches are N-channel field effect transistors, and two of them have outputs with inversed polarities.

4. The circuit of claim 1, wherein the transforming circuit further comprises a first delay unit and a second delay unit, when the first push-pull signal is inputted into the transforming circuit, the first delay unit and the second delay unit produce respectively the first transforming signal and the second transforming signal, wherein the transforming circuit further comprises a third delay unit and a fourth delay unit, and when the second push-pull signal is inputted to the transforming circuit, the third delay unit and the fourth delay unit produce respectively the third transforming signal and the fourth transforming signal.

5. The circuit of claim 4, wherein the first delay unit, the second delay unit, the third delay unit and the fourth delay unit output respectively via a driving device the first transforming signal, the second transforming signal, the third transforming signal and the fourth transforming signal.

6. The circuit of claim 1, wherein the four electronic switches comprise an internal body diode, or an external diode is connected in parallel with a current channel of each electronic switch.

7. The circuit of claim 4, wherein each pulse of the first transforming signal starts simultaneously as a pulse of the first push-pull signal starts and they will end after the pulse of the first push-pull signal has ended; each pulse of the second transforming signal starts after a pulse of the first push-pull signal and it will end before the pulse of the first push-pull signal has ended; each pulse of the third transforming signal starts concurrently as a pulse of the second push-pull signal starts and it will end after the pulse of the second push-pull signal has ended; each pulse of the fourth transforming signal will start after a pulse of the second push-pull signal has started and it will end before the pulse of the second push-pull signal has ended.

8. The circuit of claim 1, wherein the first transforming signal, the second transforming signal, the third transforming signal and the fourth transforming signal are utilized to drive simultaneously a plurality of sets of full-bridge electronic switches.

9. The circuit of claim 1, wherein a capacitor is located in between one end of the primary winding of the transformer and the full-bridge switch unit in order to filter out direct current from the alternate current.

10. The circuit of claim 1, wherein the full-bridge switch unit further comprises at least one level offset circuit, which is located in between the transforming circuit and at least one of the four electronic switches.

* * * * *